US011143554B2

(12) United States Patent
Tisserand et al.

(10) Patent No.: US 11,143,554 B2
(45) Date of Patent: Oct. 12, 2021

(54) MULTISPECTRAL IMAGING DEVICE WITH ARRAY OF MICROLENSES

(71) Applicant: SILIOS TECHNOLOGIES, Peynier (FR)

(72) Inventors: Stephane Tisserand, Aubagne (FR); Laurent Roux, Marseilles (FR); Marc Hubert, Fuveau (FR); Vincent Sauget, Aix-en-Provence (FR); Aurelien Faiola, Marseilles (FR)

(73) Assignee: SILIOS TECHNOLOGIES, Peynier (FR)

( * ) Notice: Subject to any disclaimer, the term of this patent is extended or adjusted under 35 U.S.C. 154(b) by 0 days.

(21) Appl. No.: 16/096,996

(22) PCT Filed: Apr. 27, 2017

(86) PCT No.: PCT/FR2017/000076
§ 371 (c)(1),
(2) Date: Oct. 26, 2018

(87) PCT Pub. No.: WO2017/187029
PCT Pub. Date: Nov. 2, 2017

(65) Prior Publication Data
US 2019/0145823 A1 May 16, 2019

(30) Foreign Application Priority Data

Apr. 29, 2016 (FR) ...................................... 16/00716

(51) Int. Cl.
*G01J 3/02* (2006.01)
*G01J 3/28* (2006.01)
(Continued)

(52) U.S. Cl.
CPC .......... *G01J 3/0229* (2013.01); *G01J 3/0208* (2013.01); *G01J 3/0213* (2013.01); *G01J 3/2803* (2013.01);
(Continued)

(58) Field of Classification Search
CPC ............. G01J 2003/2813; G01J 3/2823; G01J 3/0213; G01J 3/0208
See application file for complete search history.

(56) References Cited

U.S. PATENT DOCUMENTS 6,765,617 B1 * 7/2004 Tangen ............. H01L 27/14627
348/340
8,300,108 B2 * 10/2012 van Hoorebeke ..... H04N 5/332
348/218.1
(Continued)

FOREIGN PATENT DOCUMENTS

CN 104457708 A 3/2015

OTHER PUBLICATIONS

"Hamamatsu Learning Center: Microlens Arrays", XP055356158, May 2, 2015.
(Continued)

*Primary Examiner* — Hwa Andrew Lee
(74) *Attorney, Agent, or Firm* — Sughrue Mion, PLLC

(57) ABSTRACT

The invention relates to a multispectral imaging device including: a photosensitive detector DET made up of a matrix of pixels; an array of microlenses ML1, ML2, ML3 reproducing the matrix of pixels; and a filter module MF formed by a matrix of individual filters λ1, λ2, λ3 reproducing the matrix of pixels. The device is remarkable in that the array of microlenses is arranged directly in contact with the detector DET, and the filter module MF is made on a substrate SS that is put into contact with the array of microlenses.

9 Claims, 4 Drawing Sheets

(51) Int. Cl.
 G02B 3/00 (2006.01)
 G02B 5/20 (2006.01)
 G02B 19/00 (2006.01)
 G02B 5/28 (2006.01)
(52) U.S. Cl.
 CPC .......... *G01J 3/2823* (2013.01); *G02B 3/0056* (2013.01); *G02B 5/201* (2013.01); *G02B 5/284* (2013.01); *G02B 19/0076* (2013.01); *G01J 2003/2806* (2013.01); *G01J 2003/2813* (2013.01); *G01J 2003/2826* (2013.01)

(56) References Cited

U.S. PATENT DOCUMENTS

| | | | |
|---|---|---|---|
| 9,497,370 B2* | 11/2016 | Venkataraman | ............................ H01L 27/14618 |
| 10,319,760 B2* | 6/2019 | Lin | ................... H01L 27/14621 |
| 10,321,079 B2* | 6/2019 | Miyazawa | ............. H04N 5/341 |
| 2011/0049340 A1 | 3/2011 | Tisserand et al. | |
| 2014/0268146 A1 | 9/2014 | Hinnrichs | |
| 2018/0113024 A1* | 4/2018 | Hirose | .................. G01J 5/0862 |

OTHER PUBLICATIONS

International Search Report for PCT/FR2017/000076, dated Aug. 22, 2017.

\* cited by examiner

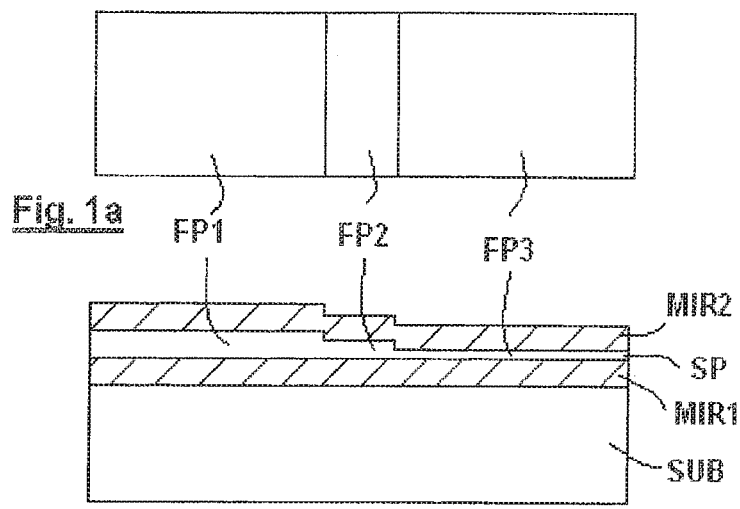
Fig. 1a
Fig. 1b
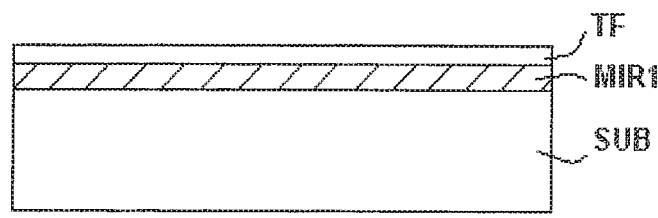
Fig. 2a
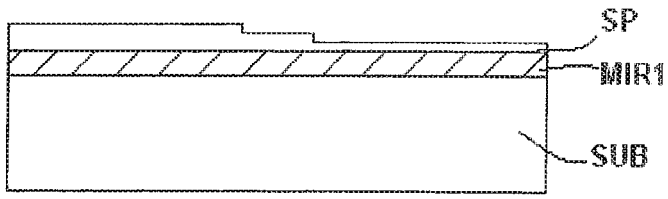
Fig. 2b
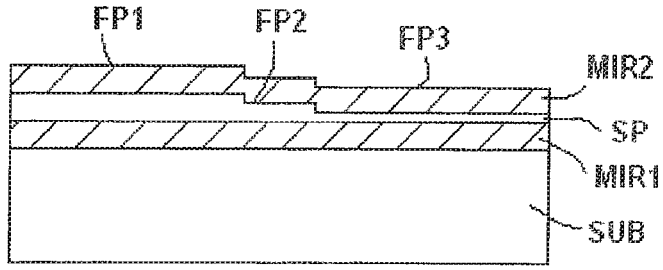
Fig. 2c

MULTISPECTRAL IMAGING DEVICE WITH ARRAY OF MICROLENSES

CROSS REFERENCE TO RELATED APPLICATIONS

This Application is a National Stage of International Application No. PCT/FR2017/000076 filed Apr. 27, 2017, claiming priority based on French Patent Application No. 16/00716 filed Apr. 29, 2016.

BACKGROUND OF THE INVENTION

The present invention relates to a multispectral imaging device.

Spectrometric analysis seeks in particular to find the chemical constituents in the composition of a solid, liquid, or gaseous medium. It involves recording the absorption spectrum of the medium in reflection or in transmission. The light that has interacted with the medium is absorbed in certain wavelength bands. This selective absorption gives a signature for some or all of the constituents of the medium. The wavelength range of the spectrum to be measured may lie in the ultraviolet range and/or the visible range and/or the (near, medium, far) infrared range.

This analysis is commonly performed using a spectrometer.

Certain spectrometers use at least one Fabry-Perot filter.

It should be recalled that such a filter is a plate with a face parallel to a material (usually of low refractive index such as air, silica, . . . ) referred to as a spacer, the spacer appearing between two mirrors. It is often made by thin layer deposition in a vacuum. Thus, for a filter having its passband centered on a center wavelength $\lambda$, the first mirror consists in m alternations of layers of a high index material H and of a low index material B, each layer having an optical thickness $\lambda/4$. The mirror may also be a semi-reflective thin metal layer. The spacer frequently consists in two layers of low index material B of optical thickness $\lambda/4$. In general, the second mirror is symmetrical to the first. The change in geometrical thickness of the spacer enables the filter to be tuned to the center wavelength for which the optical thickness is equal to a multiple of $\lambda/2$.

One known technique relies on a filter module including one filter per band for analysis. If the number of bands is n, then making n filters requires n distinct vacuum deposition fabrication operations. The cost is therefore very high (practically proportional to the number n of bands) for short runs and can become genuinely advantageous only for runs of sufficient length. Furthermore, possibilities of miniaturization in this configuration are also very limited and it is difficult to envisage providing a large number of filters.

An alternative, which has been developed more recently, makes use of a Fabry-Perot type filter module with two mirrors that are not parallel but arranged in a wedge shape for the profile in a plane perpendicular to the substrate. In this plane referenced Oxy, the axes Ox and Oy are respectively colinear with and perpendicular to the substrate, with the thickness in the Oy direction of the spacer varying linearly as a function of the position along the Ox axis where it is measured.

Document US 2006/0209413 teaches a wavelength spectroscopy device including such a filter module. It follows that in that device the tuning wavelength varies continuously along the axis Ox.

Those various technologies make it possible to analyze an item with satisfactory spectral resolution when a continuous spectrum is desired.

They are also well suited to situations in which a finite number of relatively narrow passbands suffices for identifying the looked-for constituents (i.e. a spectrum that is discrete, as contrasted to a spectrum that is continuous).

Nevertheless, they assume that the item for analysis is an indissociable entity, i.e. that is not resolved in three dimensions, and they are not suitable for identifying variations in optical transmission or reflection within the item itself.

Thus, Document FR 2 904 432 teaches an optical filter of matrix structure and an associated image sensor. The idea is to obtain different colors. Specifically, on the basis of three fundamental colors taken from the visible spectrum (red, green, blue), it is possible to reconstruct most colors.

In the above situation, a matrix of filters is used that is arranged at the surface of a matrix of detectors. The matrix of filters is a so-called "Bayer" filter, but that is of little importance for the present invention. The matrix of detectors is an active pixel sensor complementary metal oxide semiconductor (APS CMOS) matrix. The matrix is implemented on a semiconductor substrate having photosensitive zones arranged on its surface together with electronic circuits and electrical connections.

On an individual pixel, the photosensitive zone constitutes only a fraction of its total area, the remainder of its area being occupied by control electronics. It is necessary to provide microlenses, one per pixel, for focusing the incident light on the photosensitive zone of the pixel. The matrix of filters is arranged in contact with the detector, such that the assembly is in the form of a component made up of a stack comprising detectors-filters-microlenses.

Specifically, it is not possible to envisage depositing the matrix of filters on the microlenses since the topology of the microlenses is very marked. Furthermore, the microlenses are made of resin so that it can be difficult to make an inorganic filter on an organic material.

Unfortunately, the aperture angle of the incident beam on the filters is large when they are arranged under microlenses. The response of the filters is closely tied to this angle of incidence. This leads to a modification to the spectral response.

On this topic, Document US 2014/0268146 teaches an array of microlenses with integral bandpass filters to which a detector is added. Furthermore, there is a deflector between the array of microlenses and the detector.

In order to avoid this problem of angle of incidence on the filters, it is possible to envisage omitting the microlenses. Nevertheless, the photosensitive zone presents an area that is small compared with the total area of the pixels. The increase in sensitivity provided by the microlens is about 50%. It therefore appears to be inappropriate to lose sensitivity by omitting the microlenses.

It should also be mentioned that the fabrication yield of such a component is relatively low. The overall yield is substantially equal to the product of the following three yields:

detector fabrication yield;
filter matrix fabrication yield; and
microlens array fabrication yield.

As a result of multiplying together the fabrication yields of the three operations, the overall yield is reduced correspondingly.

SUMMARY OF THE INVENTION

An object of the present invention is thus to provide a multispectral imaging device that does not present the above-mentioned limitations.

According to the invention, a multispectral imaging device comprises:
- a photosensitive detector made up of a matrix of pixels;
- an array of microlenses reproducing the matrix of pixels; and
- a filter module formed by a matrix of individual filters reproducing the matrix of pixels;

which device is remarkable in that the array of microlenses is arranged directly in contact with the detector, and the filter module is made on a substrate that is put into contact with the array of microlenses.

It is advantageous to arrange the filters above the microlenses in order to avoid problems associated with the angle of incidence on the filters.

By conserving the microlenses, the sensitivity of the device is conserved.

Concerning fabrication yield, the device of the invention presents an undeniable advantage.

Specifically, it is possible to sort the filter modules in order to associate them with detectors that have themselves also been sorted.

Furthermore, there is great flexibility in the configuration selected for the filter module and the detector. It is possible to adapt the filtering to a large number of detectors in order to enhance a particular characteristic of the imager: resolution, sensitivity, noise, . . . .

Advantageously, the filter module is adhesively bonded to the detector around its periphery.

There is no adhesive between the filter module and the detector, as contrasted to adhesive lying over its entire surface.

A first advantage of this solution lies in conserving the optical function of the microlenses, thereby increasing the light flux in the photosensitive zone by 50%. The presence of adhesive between the filter module and the microlenses reduces the efficiency of the microlenses considerably since the adhesive has a refractive index close to that of the lenses.

A second advantage of this solution lies in the fact that interference fringes resulting from the sheet of air that inevitably exists between the filter module and the detector present much less contrast than they would in the presence of adhesive (about ten times less).

According to an additional characteristic, said filter module is provided with alignment patterns.

In a preferred embodiment, the filter module is made up of two mirrors spaced apart by a spacer, the filter module having a plurality of filter cells, and each of the filter cells having at least two filters.

Preferably, at least one of the filters has a bandpass transfer function.

In a particular arrangement, at least some of the filters are in alignment in a first strip.

Likewise, at least some of the filters are in alignment in a second strip parallel to and disjoint from the first strip.

Advantageously, at least two of the filters that are adjacent are separated by a crosstalk barrier.

According to another additional characteristic, the detector is integrated in CMOS technology.

Optionally, at least one of the filters is panchromatic.

The advantage of adopting a filter of broad spectral band is that it gives a photometric reference on the image. The level of light flux integrated in the spectral band is equivalent to the flux contained in "color" bands. This serves to avoid blinding pixels that are adjacent to the panchromatic pixels.

BRIEF DESCRIPTION OF THE DRAWINGS

The present invention appears below in greater detail in the context of the following description of embodiments given by way of illustration and with reference to the accompanying figures, in which:

FIGS. 1a and 1b are theoretical diagrams of a one-dimensional filter cell, and more particularly:

FIG. 1a is a plan view of the cell; and

FIG. 1b is a section view of the cell;

FIGS. 2a to 2c show three steps of a first technique for making a filter module;

Elements present in more than one of the figures are given the same references in each of them.

DETAILED DESCRIPTION OF THE INVENTION

The description begins with a filter module having a plurality of generally identical filter cells.

With reference to FIGS. 1a and 1b, a filter cell comprises three Fabry-Perot type interference filters FP1, FP2, and FP3 in successive alignment so as to form a strip.

The cell is constituted by a stack on a substrate SUB, e.g. made of glass or silica, the stack comprising a first mirror MIR1, a spacer SP, and a second mirror MIR2.

The spacer SP, which defines the center wavelength of each filter, is thus constant for a given filter, and varies from one filter to another. Its profile is staircase-shaped since each filter has a surface that is substantially rectangular.

A first method of making the filter module in thin film technology is given by way of example.

With reference to FIG. 2a, the first mirror MIR1 is initially deposited on the substrate SUB followed by one or more dielectric layers TF for defining the spacer SP. The mirror is either metallic or dielectric.

With reference to FIG. 2b, the dielectric TF is etched:
- initially in the second and third filters FP2 and FP3 in order to define the thickness of the spacer SP in the second filter FP2; and
- subsequently in the third filter FP3 in order to define the thickness of the spacer in the third filter.

The spacer SP in the first filter FP1 has the deposition thickness.

With reference to FIG. 2c, the second mirror MIR2 is deposited on the spacer SP in order to finalize the three filters.

The spacer SP may be obtained by depositing a dielectric TF followed by successive etching as described above, but it could also be obtained by depositing a plurality of thin layers in succession.

By way of example, the wavelength range 800 nanometers (nm) to 1000 nm can be scanned by modifying the optical thickness of the spacer over the range $1.4\lambda_0/2$ to $2.6\lambda_0/2$ (for $\lambda_0$=900 nm and n=1.45, with e varying over the range 217 nm to 403 nm).

It should be observed at this point that the thickness of the spacer needs to be small enough to obtain only one transmission band in the range to be probed. Specifically, the greater this thickness, the greater the number of wavelengths that satisfy the condition [ne=$k\lambda/2$].

A second method of making the filter module is described below.

Figure 3A:
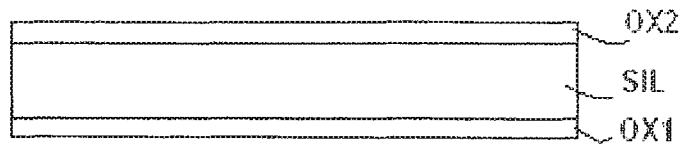
FIGS. 3a to 3f show six steps of a second technique for making the filter module.

With reference to FIG. 3a, the method begins by thermally oxidizing a silicon substrate SIL on its bottom face OX1 and on its top face OX2.

Figure 3B:
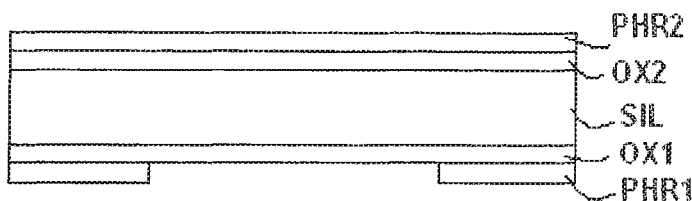

With reference to FIG. 3b, the bottom and top faces OX1 and OX2 of the substrate are covered respectively in a bottom layer PHR1 and a top layer PHR2 of photosensitive resin. Thereafter, a rectangular opening is formed in the bottom layer PHR1 by photolithography.

Figure 3C:
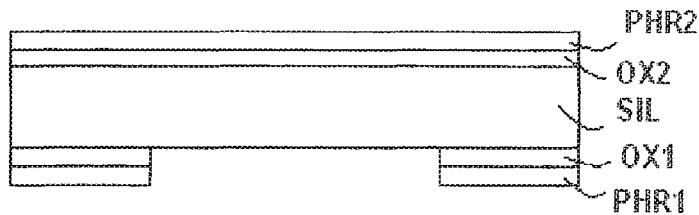

With reference to FIG. 3c, the thermal oxide on the bottom face OX1 is etched in register with the rectangular opening formed in the bottom layer PHR1. The bottom and top layers PHR1 and PHR2 are then removed.

Figure 3D:
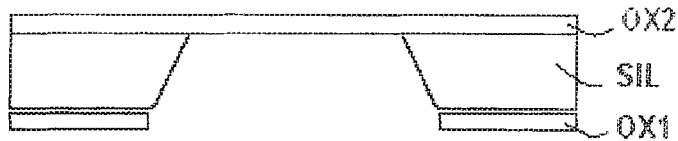

With reference to FIG. 3d, the substrate SIL is subjected to anisotropic etching (e.g. crystallographic orientation 1-0-0) in register with the rectangular opening, the thermal oxide of the bottom face OX1 acting as a mask and the thermal oxide of the top face OX2 acting as an etching stop layer. The etching may either be wet, using a solution of potassium hydroxide (KOH) or of trimethyl ammonium hydroxide (TMAH), or dry, in a plasma. The result of this operation is that there remains only an oxide membrane at the bottom of the rectangular opening.

Figure 3E:

With reference to FIG. 3e, this oxide is etched:
initially in the second and third filters FP2 and FP3 in order to define the thickness of the spacer SP in the second filter FP2; and
subsequently in the third filter FP3 in order to define the thickness of the spacer SP in the third filter.

Figure 3F:
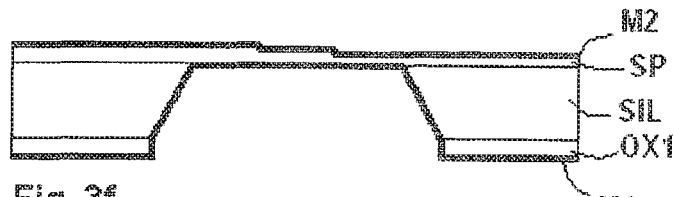

With reference to FIG. 3f, the first and second mirrors M1 and M2 are deposited on the bottom and top faces OX1 and OX2 of the substrate SIL.

It is optionally possible to terminate making the filter module by depositing a passivation layer (not shown) on one and/or the other of the bottom and top faces OX1 and OX2.

The invention thus makes it possible to make a set of aligned filters, which filters may be referenced in a one-dimensional space.

Figure 4:
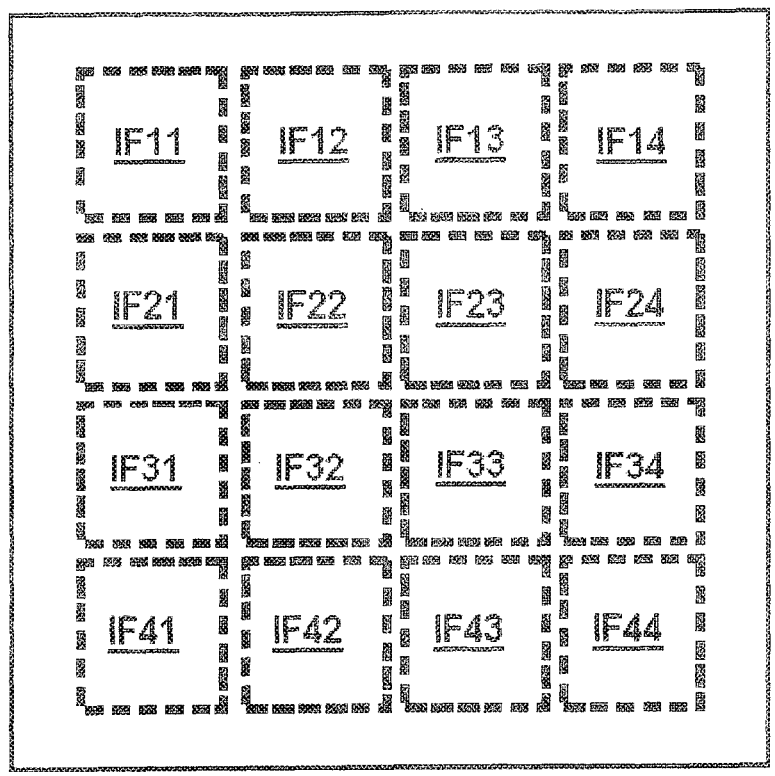
FIG. 4 is a theoretical diagram of a two-dimensional filter module.

With reference to FIG. 4, the invention also makes it possible to organize the filter cells in a two-dimensional space. Such an organization is often referred to as a matrix.

Four identical horizontal strips each comprise four cells. The first strip, which appears at the top of the figure, corresponds to the first row of an matrix and comprises cells IF11 to IF14. The second, third, and fourth strips respectively comprise the cells IF21 to IF24, the filters IF31 to IF34, and the cells IF41 to IF44.

The organization is said to be a matrix since the cell IFjk belonging to the $j^{th}$ horizontal strip is also part of a $k^{th}$ vertical strip comprising the cells IF1k, IF2k, . . . , IF4k.

Figure 5:
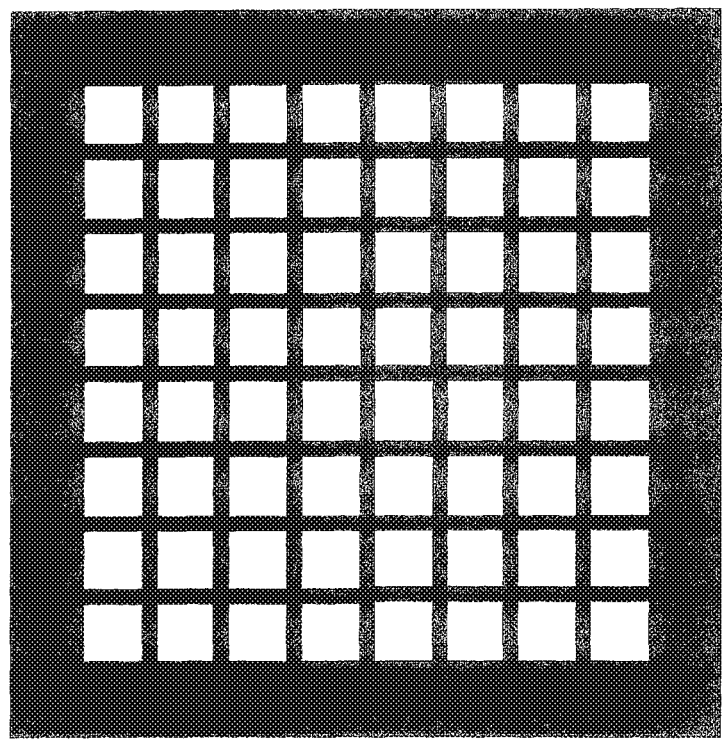
FIG. 5 is a diagram of a filter module having 64 filters having a screening grid.

With reference to FIG. 5, it is desirable for the various filters of the filter module to be well separated in order to avoid any partial overlap of one filter on a filter adjacent thereto, and in order to minimize any problem with crosstalk. To do this, it is possible to add a grid on the filter module (shown in black in the figure) constituting a crosstalk barrier for defining all of the filters. This grid should be absorbent. By way of example, an absorbent grid may be made by depositing and etching black chromium (chromium+chromium oxide), while a reflecting grid may be made by depositing and Etching chromium.

Figure 6:
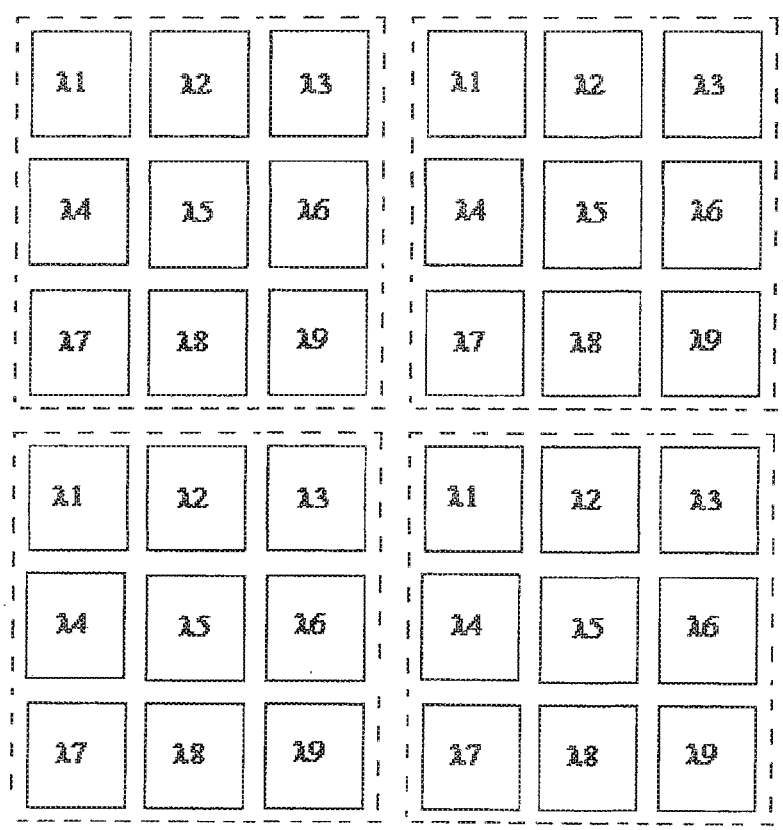
FIG. 6 is a diagram of a filter module in which each cell comprises nine filters.

With reference to FIG. 6, each filter cell now has nine filters. Each of these cells is in the form of a square within which there is a corresponding filter tuned to a distinct wavelength $\lambda 1, \lambda 2, \lambda 3, \lambda 4, \ldots, \lambda 9$.

In this figure, for reasons of clarity, the spacing between the cells is voluntarily increased compared with the spacing between two filters. Naturally, in reality, these spacings are identical.

The filter module is thus associated with a detector capable of measuring the light fluxes produced by the various filters. The detector is thus made up of a plurality of compartments.

Figure 7:
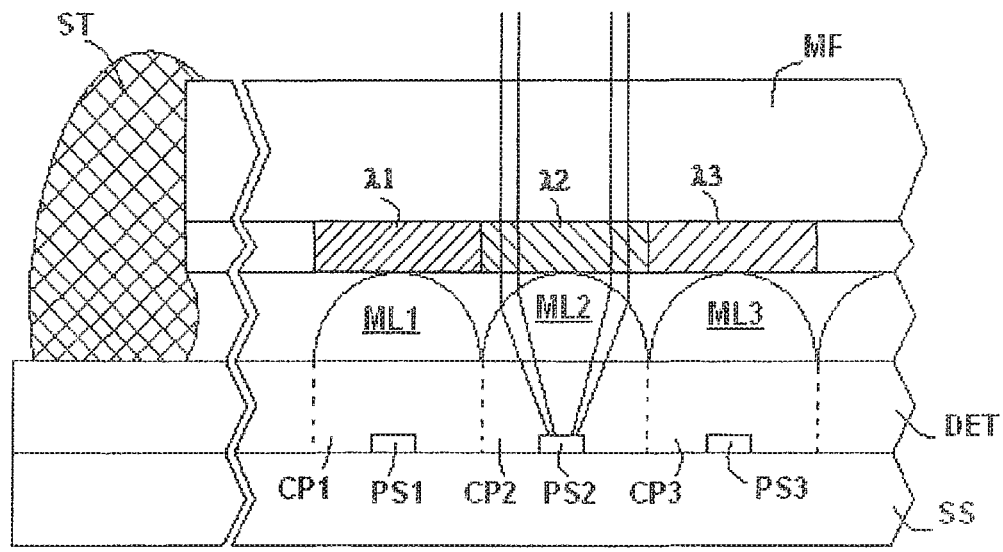
FIG. 7 is a section diagram of a device of the invention.

With reference to FIG. 7, there can be seen the filter module MF as shown in FIG. 6.

The detector DET is made using CMOS technology on a substrate SS made of silicon. At the center of each compartment CP1, CP2, CP3 of square shape there is a photosensitive zone PS1, PS2, PS3.

Above each compartment CP1, CP2, CP3, there is a microlens ML1, ML2, ML3 of diameter equal to the side of the compartment.

The filter module MF bears against the array of microlenses ML1, ML2, ML3, such that the filters $\lambda 1, \lambda 2, \lambda 3$ face the microlenses ML1, ML2, ML3.

The positioning of this module MF is performed by means of alignment patterns, a technique known to the person skilled in the art of photolithography, which is therefore not described in greater detail herein.

The filter module MF is fastened on the detector DET by means of a margin of adhesive ST.

To clarify ideas, it is specified that the pixels commonly have a size of the order of 5 micrometers.

The above-described embodiments of the invention have been selected because of their concrete nature. Nevertheless, it is not possible to list exhaustively all possible embodiments covered by the invention. In particular, any of the means described may be replaced by equivalent means without going beyond the ambit of the present invention.

The invention claimed is:

1. A multispectral imaging device comprising:
a photosensitive detector made up of a matrix of pixels formed on a first substrate, each pixel comprising a photosensitive zone;
an array of microlenses, each of the microlenses overlapping one corresponding pixel of the matrix of pixels, each of the microlenses configured for focusing incident light on a photosensitive zone of the corresponding pixel, each lens being a plano-convex lens with a flat side facing the photosensitive detector; and
a filter module formed by a matrix of individual filters each facing one pixel of the matrix of pixels;
wherein the filter module comprises a bidimensional matrix of at least four generally identical filter cells, each of the filter cells having at least two of the individual filters;
wherein the filter module is formed on a second substrate and faces said array of microlenses, with one of the individual filters in direct contact with a convex side of a corresponding one of the microlenses; and
said filter module is adhesively bonded to said detector by adhesive located at an outside edge of the filter module, so that there is no adhesive between the filter module and the photosensitive zones of the photosensitive detector.

2. A device according to claim 1, characterized in that said filter module is provided with alignment patterns.

3. A device according to claim 1, characterized in that said filter module is made up of two mirrors spaced apart by a spacer, the filter module having a plurality of filter cells and each of said filter cells having at least two filters.

4. A device according to claim 3, characterized in that at least one of said filters has a bandpass transfer function.

5. A device according to claim 3, characterized in that at least some of said filter cells are in alignment in a first strip.

6. A device according to claim 5, characterized in that at least some of said filter cells are in alignment in a second strip parallel to and at a distance from the first strip.

7. A device according to claim 3, characterized in that at least two of said filters that are adjacent are separated by a crosstalk barrier.

8. A device according to claim 3, characterized in that at least one of said filters is panchromatic.

9. A device according to claim 1, characterized in that said detector is integrated in CMOS technology.

* * * * *